Sept. 29, 1959     P. W. BUECHLER     2,906,427
COMPOSITE SALAD BOWL
Filed Dec. 21, 1953     2 Sheets-Sheet 1
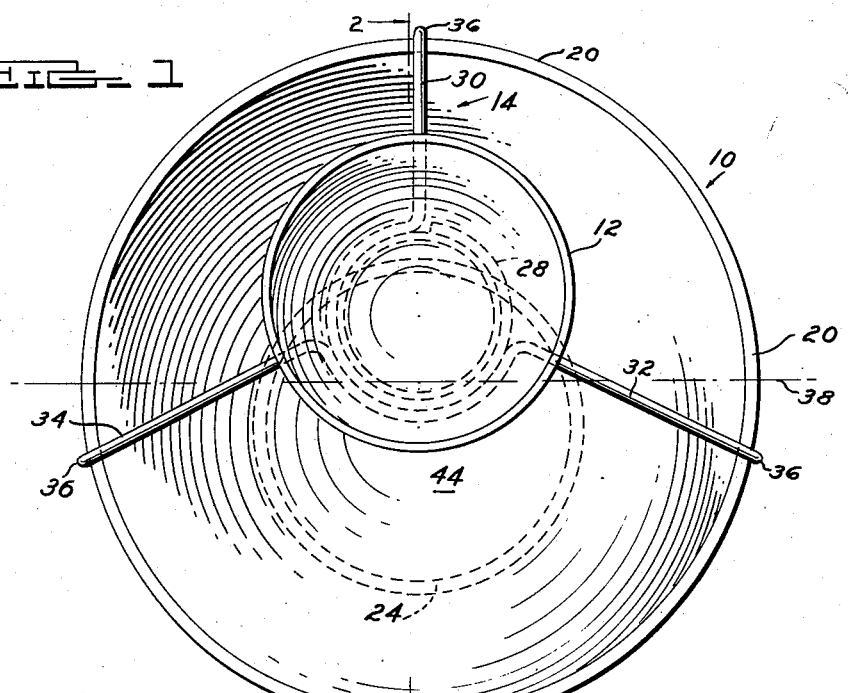
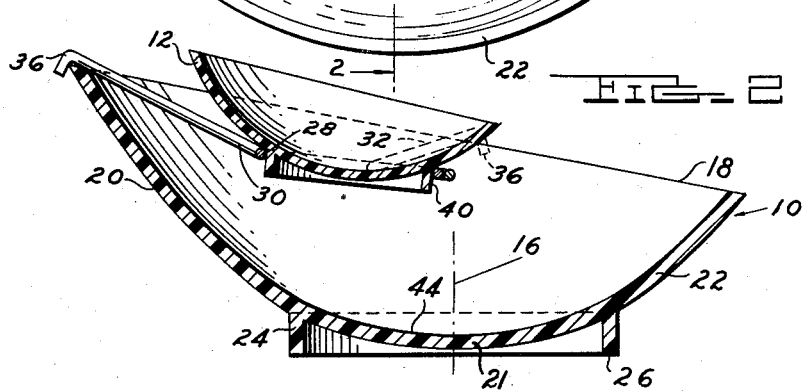
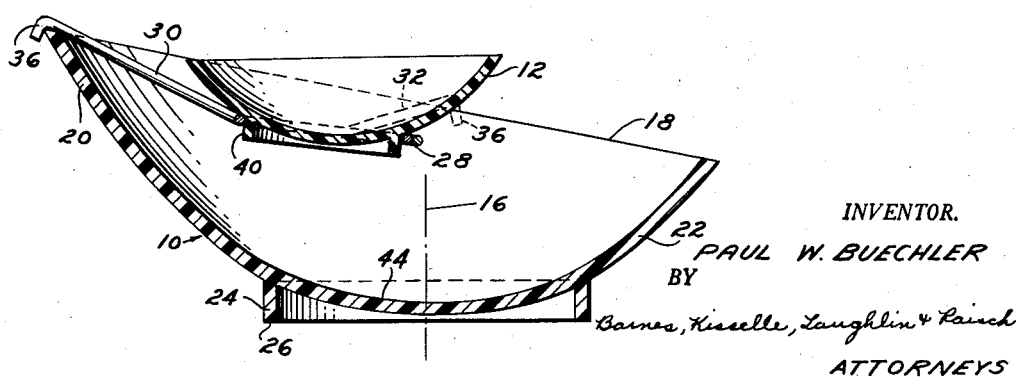
INVENTOR.
PAUL W. BUECHLER
BY
Barnes, Kisselle, Laughlin & Raisch
ATTORNEYS Sept. 29, 1959 P. W. BUECHLER 2,906,427
COMPOSITE SALAD BOWL
Filed Dec. 21, 1953 2 Sheets-Sheet 2
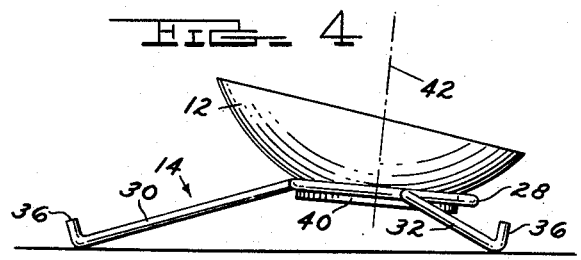
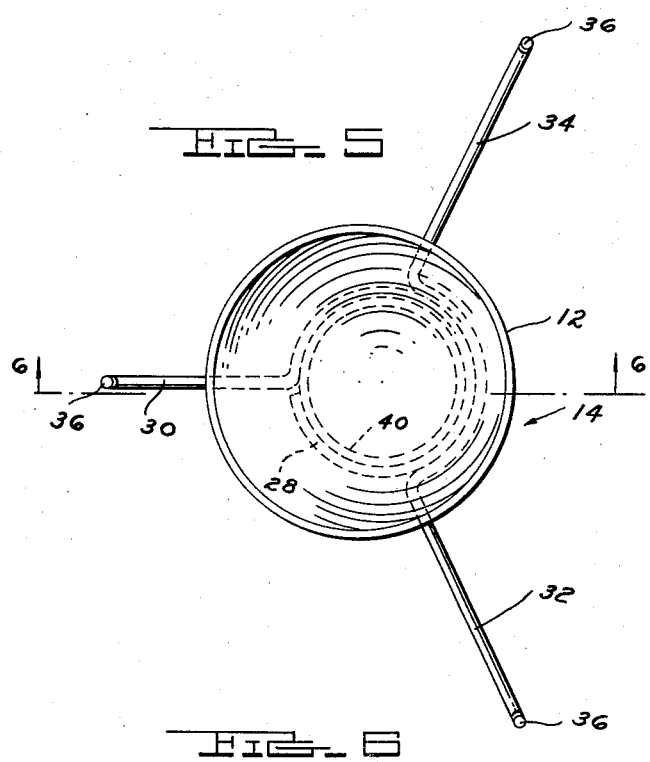
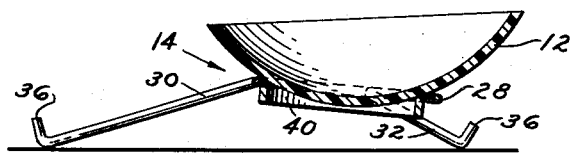
INVENTOR.
PAUL W. BUECHLER
BY
Barnes, Kisselle, Laughlin & Raisch
ATTORNEYS

United States Patent Office 2,906,427
Patented Sept. 29, 1959

2,906,427

COMPOSITE SALAD BOWL

Paul W. Buechler, Royal Oak, Mich.

Application December 21, 1953, Serial No. 399,325

10 Claims. (Cl. 220—23.83)

This invention relates to a bowl of the type used in preparing and serving tossed salads and the like.

A tossed salad is made by placing a quantity of chopped vegetables in a relatively large bowl, adding salad oil and seasoning and then tossing or tumbling the vegetables in the bowl usually by a two-handed operation, using a large salad fork and spoon. Such a bowl is frequently used for serving such foods as iced shrimp or potato chips with a sauce provided separately in a smaller bowl.

It is an object of this invention to provide a salad bowl improved for quicker and easier preparation and serving of tossed salads and to provide a dressing or sauce bowl for accessory use therewith. One form of the invention is shown in the accompanying drawings which may be briefly described as follows:

Fig. 1 is a top plan view of the device of this invention showing a large bowl with a smaller bowl mounted therein.

Fig. 2 is a sectional view taken on line 2—2 of Fig. 1.

Fig. 3 is similar to Fig. 2 but showing the smaller bowl rotated substantially 180 degrees from the Fig. 2 position.

Fig. 4 is a side elevation illustrating a smaller bowl and rack removed from the large bowl and resting on a horizontal surface.

Fig. 5 is a plan view of the small bowl and rack removed from the large bowl.

Fig. 6 is a sectional view taken on line 6—6 of Fig. 5.

Shown in the drawings is a salad bowl 10 of a size suitable for preparing and serving a tossed salad and a smaller sauce bowl 12 supportable on the salad bowl by a rack 14. The salad bowl has a form in the nature of a paraboloid of revolution with a principal axis generally indicated in broken lines at 16. The edge 18 of the salad bowl lies in a plane angled to the principal axis so that the bowl has a high side 20 and a low side 22. The vertex portion 21 of the bowl is positioned generally lowermost as illustrated. The bowl has a base 24 which preferably comprises a cylindrical projection generally concentric with the principal axis of the bowl and having a portion 26 for resting on a generally horizontal supporting surface.

The rack 14 is preferably formed of relatively heavy gauge metal wire and has a ring portion 28 with legs 30, 32 and 34 radiating therefrom. Each leg has a laterally extending end portion 36 formed to hook over the edge 18 of the salad bowl. One leg 30 hooks over the high side 20 of the bowl while the other two legs hook over regions of the bowl intermediate the low side 22 and the minor axis 38 (Fig. 1) of the slightly elliptical upper edge of the bowl. The bracket is, for practical purposes, rigid so that its legs will not spread or close relatively to each other during use. The rack thus binds against lateral motion in any direction on the bowl. The legs are angled to the plane of the ring 28.

The sauce bowl 12 is preferably of spherical form and has a cylindrical portion 40 projecting radially outwardly whose axis 42 is angled to the edge of the bowl as illustrated in Fig. 4. The projection 40 fits rotatably within the ring portion 28 of the rack 14.

The parabolic shape and angled upper edge 18 of the salad bowl 10 provide a high, steep side 20 against which the vegetables may be tossed in preparation of a salad. The vegetables are pushed from the bottom of the bowl up the side 20 and because of the height and steepness of the side 20 the vegetables tend to fall back toward the bottom of the bowl. Thus a salad may be prepared by a one hand operation utilizing only a single implement. The parabolic shape of the salad bowl also provides a relatively deep well 44 at vertex 21 for collecting and concentrating the salad oils and seasoning.

Food may be banked against the high side 20 of the salad bowl and this feature together with the tilted upper edge 18 of the bowl facilitates a very effective display of the food on occasions where pleasing appearance is desirable such as in buffet luncheons. Food may be very easily served or removed from the salad bowl over the low side 22 of the bowl.

In serving food with a separate sauce or dressing the food is placed in the salad bowl 10 and the sauce in the sauce bowl 12 which may be suspended in the salad bowl by means of the rack 14. By rotating the sauce bowl on the rack it may be tilted for maximum attractive display as shown in Fig. 2 or may be adjusted to a more level position for maximum capacity as illustrated in Fig. 3. The danger of spilling the contents of the sauce bowl is minimized by the stable attachment of the rack 14 on the bowl 10 and stable engagement of the projection 40 within the ring 28.

To use the sauce bowl 12 separately from the salad bowl the rack is merely removed from the salad bowl, inverted and placed on a supporting table or other surface. The legs 32, 34 and 36 of the rack are angled to the plane of the ring 28 to provide an elevated stand for the sauce bowl 12 which is mounted thereon by inserting the projection 40 into the ring 28. The ring is angled to the horizontal so that the sauce bowl may be selectively tilted for maximum display or maximum capacity purposes (Figs. 4 and 6) by rotating the bowl on the stand. The lateral ends 36 of the legs of the rack now serve as feet.

It will be observed that in use the axis of rotation of bowl 12 is acutely angled to the vertical and is disposed at an angle of other than 90° to the general plane of the top of bowl 12. The latter angle may be termed for convenience an acute angle.

The entire composite salad bowl is not only functionally improved but embodies the gracefully curved asymmetric proportions essential in modern product design.

I claim:

1. A composite salad bowl comprising, a relatively large bowl, a relatively small bowl, support means supporting said small bowl on said large bowl, said large bowl including means to support said large bowl so that one portion of said large bowl extends higher than another portion of said large bowl with the top of said large bowl extending at an angle to the horizontal, said small bowl being rotatable relatively to its said support means, the top of said small bowl extending at an angle to its axis of rotation, whereby said small bowl is selectively tiltable relatively to said large bowl by rotating said small bowl on its said support.

2. A composite salad bowl comprising, a relatively large bowl, a relatively small bowl, support means supporting said small bowl on said large bowl, said large bowl including means to support said large bowl so that one portion of said large bowl extends higher than another portion of said large bowl with the top of said large bowl extending at an angle to the horizontal, said small bowl being rotatable relatively to its said support means about an axis angled to the vertical, the top of said bowl extending at an angle to its axis of rotation, whereby said small bowl is selectively tiltable by rotating the same on its said support.

3. A composite salad bowl comprising, a relatively large bowl, a relatively small bowl, and support means supporting said small bowl on said large bowl, said large bowl including means adapted to rest on a generally horizontal support, the latter said means being displaced from the central portion of said large bowl so that when the said latter means is resting on the support one portion of the said large bowl extends higher than another portion of a large bowl and the top of said large bowl extends at an angle to the horizontal, said small bowl being laterally offset relatively to the lowermost portion of said large bowl toward the higher side of said large bowl, said small bowl being rotatable relatively to its said support means, the top of said small bowl extending at an angle to its axis of rotation whereby said small bowl is selectively tiltable relatively to said large bowl by rotating said small bowl on its said support means.

4. The composite salad bowl defined in claim 3 wherein said support means for said small bowl comprises, a web element removably engageable with the top of said large bowl, said web element having a central annular portion within the large bowl, said small bowl having a projection rotatably received in said annular portion.

5. The composite salad bowl defined in claim 4 wherein said web element comprises a ring with a plurality of legs radiating therefrom, each leg having a laterally extending end portion for engaging the edge of the large bowl, said legs being angled to the plane of said ring such that said ring lies within the concavity of the large bowl when the web is mounted thereon.

6. The composite salad bowl defined in claim 5 wherein said web element has three legs radiating from said ring, one of said legs being positioned to engage one portion of the edge of the large bowl, the other legs being positioned to engage other portions of the edge of the large bowl, said one portion and said other portions lying on opposite sides of a diameter of the top of the large bowl.

7. The combination recited in claim 5 characterized in that the angle of said ring to a horizontal supporting surface is substantially equal to the angle between the plane of the edge of the small bowl and a plane substantially perpendicular to the axis of said cylindrical projection.

8. A composite salad bowl comprising, a relatively large bowl, said large bowl including means to support said large bowl so that one portion thereof extends higher than another portion with the top of said large bowl extending at an angle to the horizontal, said large bowl having generally the form of a paraboloid with its vertex portion generally lowermost, a relatively small bowl, a web element for supporting said small bowl within said large bowl, said web element including a central portion and leg portions, said leg portions engaging the top of said large bowl generally adjacent its highest portion and at locations on the opposite side of a diameter of the top of the large bowl from said highest portion, said central portion of said web element being displaced laterally from said vertex portion of the large bowl toward the higher side thereof, said central portion lying within the concavity of said large bowl, said small bowl being rotatably supported by said central portion, the top of said small bowl being angled to its axis of rotation, said axis of rotation being angled to the vertical, whereby said small bowl is selectively tiltable by rotating the same on said central portion of said web element.

9. In combination, a bowl having a closed bottom to form a vessel for containing foodstuffs, means forming a stand adapted to engage a supporting surface, said bowl being rotatably mounted on said stand, the axis of rotation of said bowl being acutely angled to the vertical, said bowl having a top which lies substantially in a plane which is acutely angled to said axis of rotation, the slope of said plane being regulable relative to said stand upon rotation of said bowl on said axis, whereby said bowl is selectively tiltable relatively to a surface supporting said stand.

10. A composite salad bowl comprising, a large bowl, a small bowl, means forming a support which supports said small bowl on said large bowl, said small bowl being rotatable relatively to said means about an axis of rotation angled to the vertical, the top of said small bowl being angled to said axis of rotation whereby said small bowl is selectively tiltable relatively to the vertical by rotating said small bowl relatively to said means.

References Cited in the file of this patent

UNITED STATES PATENTS

| | | |
|---|---|---|
| D. 122,576 | Steinhilber | Sept. 17, 1940 |
| D. 149,722 | Zeisel | May 18, 1948 |
| 484,459 | Reynolds | Oct. 18, 1892 |
| 714,827 | Soltmann | Dec. 2, 1902 |
| 740,264 | Fitzgerald | Sept. 29, 1903 |
| 943,162 | Schlesinger | Dec. 14, 1909 |
| 1,123,793 | Pick | Jan. 5, 1915 |
| 1,225,870 | Schwing | May 15, 1917 |
| 1,240,452 | Hotchkin | Sept. 18, 1917 |
| 1,509,593 | Felger | Sept. 23, 1924 |
| 1,989,574 | Roosendael | Jan. 29, 1935 |
| 1,996,856 | Crane | Apr. 9, 1935 |
| 1,997,529 | Miller | Apr. 9, 1935 |
| 2,034,478 | Levy | Mar. 17, 1936 |
| 2,121,165 | Slobodkin | June 21, 1938 |
| 2,170,311 | Smith | Aug. 22, 1939 |
| 2,413,535 | Weidler | Dec. 31, 1946 |
| 2,533,853 | Tinder | Dec. 12, 1950 |

FOREIGN PATENTS

| | | |
|---|---|---|
| 105,209 | Australia | Sept. 19, 1938 |
| 491,517 | Great Britain | Sept. 5, 1938 |